United States Patent [19]

Siddiqui

[11] Patent Number: 5,715,972
[45] Date of Patent: Feb. 10, 1998

[54] MOLTEN THERMOPLASTIC MATERIAL SUPPLY SYSTEM WITH ISOLATED GRID

[75] Inventor: Shahid A. Siddiqui, Roswell, Ga.

[73] Assignee: Nordson Corporation, Westlake, Ohio

[21] Appl. No.: 549,874

[22] Filed: Oct. 30, 1995

[51] Int. Cl.⁶ .................................................. B67D 5/62
[52] U.S. Cl. ........................................ 222/146.5; 219/421
[58] Field of Search .......................... 222/146.1, 146.2, 222/146.5; 219/420, 421, 422, 424, 426, 427, 521

[56] References Cited

U.S. PATENT DOCUMENTS

| | | | |
|---|---|---|---|
| 3,130,876 | 4/1964 | Baker | 222/146.5 |
| 3,352,279 | 11/1967 | Lockwood | 219/421 X |
| 3,598,282 | 8/1971 | Phillips et al. | 222/146.5 X |
| 3,876,105 | 4/1975 | Kelling | 219/421 X |
| 3,964,645 | 6/1976 | Scholl | 222/146.5 |
| 4,308,447 | 12/1981 | Notzold et al. | 219/422 X |
| 4,505,669 | 3/1985 | Rogers | 222/146.5 X |
| 4,666,066 | 5/1987 | Boccagno et al. | 222/146.5 |
| 4,771,920 | 9/1988 | Boccagno et al. | 222/146.5 |

*Primary Examiner*—Kevin P. Shaver
*Attorney, Agent, or Firm*—Rankin, Hill, Lewis & Clark

[57] ABSTRACT

A system for supplying melted thermoplastic material to a dispenser comprises a hopper for storing solid thermoplastic material. The hopper has interior side walls and an outlet. A reservoir block is located below the hopper. The reservoir block includes a reservoir into which melted material may flow from the hopper. A manifold and pump assembly is connected to the reservoir block for receiving material from the reservoir and pumping the material to a dispenser. A heating grid at the outlet of the hopper heats and melts the solid thermoplastic material in the hopper. The grid comprises a block which is spaced from the interior sidewalls of the hopper. The grid is thus thermally isolated from the exterior of the system resulting in more efficient heating of the material.

21 Claims, 5 Drawing Sheets

MOLTEN THERMOPLASTIC MATERIAL SUPPLY SYSTEM WITH ISOLATED GRID

BACKGROUND OF THE INVENTION

1. Field of the Invention

This invention relates to apparatus for melting and supplying thermoplastic materials to a dispensing system.

2. Description of the Prior Art

Thermoplastic materials or so-called "hot melt" materials have been used for many years for various purposes, including as adhesives in the manufacturing of products such as disposable diapers and in the manufacturing of packaging. Historically, the thermoplastic material was converted from a solid to a molten state in a tank having heated walls. The melted material was maintained in the molten state in the tank in sufficient volume to supply one or more applicators or dispensers. If the job or application required a substantial volume of hot melt material, a substantially large volume of material was required to be maintained in the molten or melted state, necessitating a long warm up or start up time for the apparatus, as well as prolonged exposure of at least some of the molten material to heat and/or to oxygen.

To avoid these problems, so-called grid-type hot melt supply systems were developed in which the solid thermoplastic material was stored in a hopper and melted upon the top of a heated grid located at the bottom of the hopper. The melted material then passed through holes in the grid into a relatively small holding reservoir from which the molten material was supplied by a pump beneath the reservoir to a dispenser. Grid-type supply systems have been capable of melting and supplying thermoplastic material at a very high rate, and the molten material is not maintained in a molten state for prolonged periods of time to char, oxidize, or otherwise degrade. A typical grid type hot melt supply system is disclosed in U.S. Pat. No. 3,946,645.

The heating grids of the prior art were essentially plates provided with a plurality of holes. The thermoplastic material on top of the grid was heated and melted by the grid, and the molten material then flowed through the holes from the hopper into the reservoir. A plurality of deflector plates was provided in the reservoir beneath the holes in the grid to deflect the material falling into the reservoir and to assure that the material was thoroughly heated and melted. For example, U.S. Pat. No. 4,666,066 discloses another grid melter comprising a reservoir atop which is mounted a heated grid. A hopper for receiving the solid thermoplastic material is mounted atop the heated grid. Mounted in the bottom of the reservoir is at least one pump and a flow path or flow passage from the reservoir outlet to the pump inlet.

When the grids did not melt brick or block form solid thermoplastic material as quickly and efficiently as desired, they needed to be repaired or replaced. Melting grids, such as the one disclosed in U.S. Pat. No. 4,667,850, originally used cartridges inserted into the grids to provide heating, and the failure or inefficiency of the grid was sometimes attributable to a failed heater cartridge. To avoid this problem, the design of the grids has been changed, and a single continuous heater element has been cast into the grid. This cast-in-place heater element is used instead of multiple individual heater cartridges. Grid melters with cast in situ heaters, such as those disclosed in U.S. Pat. No. 4,771,920, are less expensive to manufacture and have a longer life than grid melters having cartridge-style heaters.

While heating grids with cast-in heating elements have been more reliable than those which used cartridges, the heating grids have still needed to be repaired or replaced from time to time. Sometimes, the grid needs to be removed to provide access to the reservoir beneath the grid, such as when a foreign object has passed through the holes in the grid and fallen into the reservoir. Since the grid formed the bottom of the hopper with the hopper was supported on the grid, it has not been possible to remove the grid without also removing the hopper. Thus, removal of the grid for replacement or repair or for cleaning the reservoir has required that the entire hopper assembly be disassembled.

Another problem with prior art grid designs has been that, in use, as various extraneous objects or impurities enter the hopper, the openings in the grid could become clogged. As the openings became clogged, the flow rate of material through the grid decreased. If the flow rate decreased to an unacceptable rate level, the system had to be shut down and the grid removed and cleaned. System shutdown should be avoided, since it allows the material in the reservoir and the hopper to solidify, and this material must thereafter be reincited, resulting in lost productivity.

Since prior art grids were designed primarily to heat and melt the solid thermoplastic in the hopper, little attention has been paid to the amount of energy wasted by the grid. The grids typically have comprised a plate which extends from side to side beneath the hopper, effectively forming the bottom of the hopper. Since the heating grid provided the primary means for heating the thermoplastic material, it was heated to a much higher temperature than the other components of the system. A large amount of the heat was thus produced by the grid, and some of this heat was lost as heat radiated outwardly from the sides of the hopper and the reservoir. Much of the energy consumed by the system is used by the grid in heating the thermoplastic material. If it were possible to use this energy more efficiently, and to heat the thermoplastic material in a more productive manner, the system could be operated more efficiently and at less cost.

SUMMARY OF THE INVENTION

The present invention provides a melting grid for a molten thermoplastic material supply system which has a different design from the prior art melting grids. The melting grid of this invention is formed in the shape of a block located in the middle of the bottom of the hopper. The grid is spaced from the side walls of the hopper and is thus thermally isolated from the hopper side walls. The isolated heating grid of the present invention provides more efficient heating of the thermoplastic material by retaining the heat within the system. The design of the heating grid also avoids the use of holes which extend through the grid and which can become clogged.

Unlike the heating grids of the prior art which extended beneath the hopper from side to side and provided the support for the hopper, the grid of the present invention is positioned in the middle of the hopper, providing a space or gap between the periphery of the grid and in the interior side walls of the hopper on the sides of the grid. The thermoplastic material heated by the grid flows over the grid and through this gap around the sides of the grid. Since the grid does not extend to the hopper side walls, the heat generated by the grid is not readily lost to the exterior of the system. Effectively all of the heat generated by the grid is used to melt the thermoplastic material. Since most thermoplastic materials have good thermal insulating properties, the layer of molten thermoplastic material in the gap thermally insulates the grid from the exterior of the system. The system of the present invention thus uses the heat generated by the grid more efficiently, since less heat is lost to the outside. In addition, the grid provides a more effect heating of the thermoplastic material than the systems using grids of the prior art.

The melting grid channels the thermoplastic material around the periphery of the heating grid to heat and to melt the material. All of the thermoplastic material flows around the periphery of the grid rather than through the grid itself. There are no holes in the grid which could become clogged, and there is no need for deflector plates in the reservoir beneath the grid holes.

By supporting the grid entirely from below, it is also possible to make the grid removable from the assembly without removing the hopper. Thus, if it is desired to repair or replace the grid, the grid can be removed by lifting it through the hopper, and it is not necessary to disassemble the hopper assembly. The easy removability of the grid also facilitates the recovery of foreign objects which may have fallen into the reservoir. It is possible that objects can be inadvertently dropped into the hopper, and some of these objects may be small enough to pass through the gap around the grid and into the reservoir. Since the grid can be removed upwardly through the hopper without removing the hopper assembly, it is possible to remove these objects quickly and easily without further disassembling the system.

These and other advantages are provided by the present invention of a system for supplying melted thermoplastic material to a dispenser. The system comprises a hopper for storing solid thermoplastic material. The hopper has interior side walls and an outlet. A reservoir block is located below the hopper. The reservoir block includes a reservoir into which melted material may flow from the hopper. A manifold and pump assembly is connected to the reservoir block for receiving material from the-reservoir and pumping the material to a dispenser. A heating grid at the outlet of the hopper heats and melts the solid thermoplastic material in the hopper. The grid comprises a block which is spaced from the interior sidewalls of the hopper.

DETAILED DESCRIPTION OF THE PREFERRED EMBODIMENT

Figure 1:
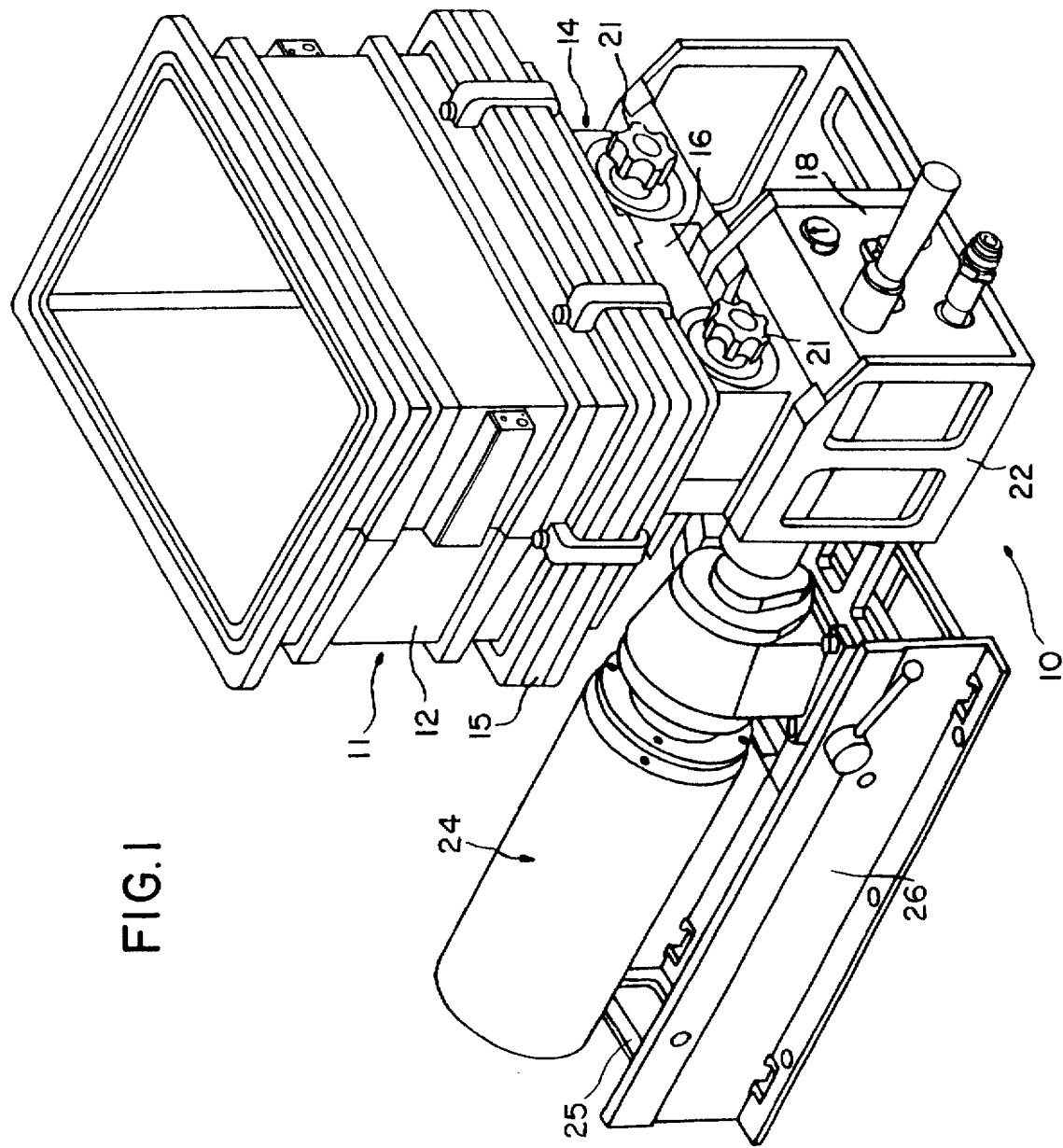
FIG. 1 is a perspective front view of the thermoplastic supply system of the present invention, with the support structure omitted.
Figure 2:
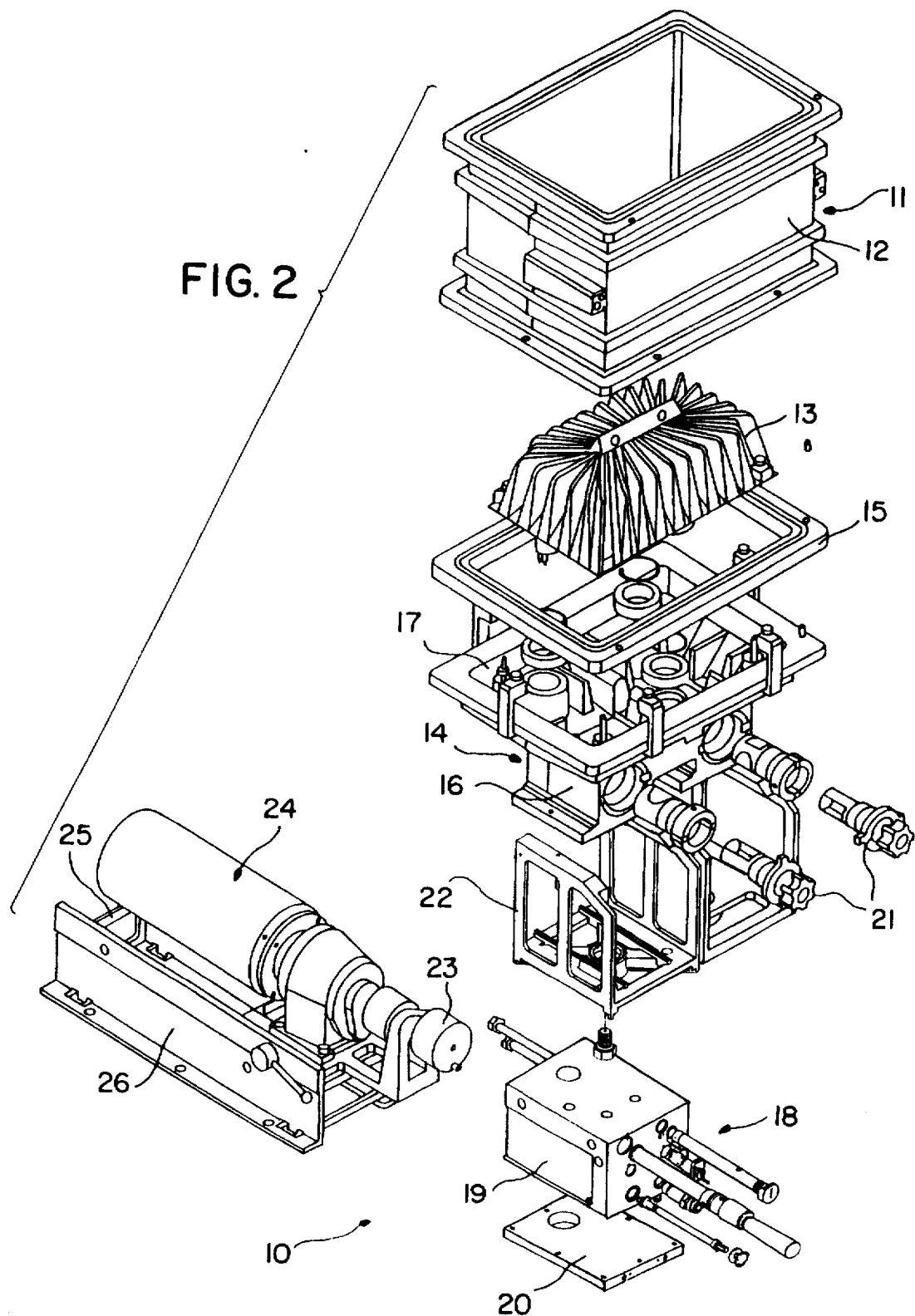
FIG. 2 is an exploded perspective front view of the thermoplastic supply system of FIG. 1.

Referring more particularly to the drawings and initially to FIGS. 1 and 2, there is shown the thermoplastic material supply system 10 of the present invention. The system is used for various purposes, such as to apply hot melt adhesive in a manufacturing line for specific products, such as for disposable diapers. A manufacturing line of disposable diapers may include, by way of example, a station for applying adhesive to the left and right leg elastic, to the waist elastic attachment and to the cuff elastic. The supply system 10 is connected to dispensers or applicators located at the manufacturing line by means of heated supply hoses. Various types of dispensers or applicators may be in the manufacturing line to apply the material, and these dispensers are not part of this invention. The supply system 10 is used to heat the solid thermoplastic material and to supply the molten material through various numbers of supply hoses to the dispensers.

The system 10 comprises a hopper assembly 11 for receiving and storing a supply of solid thermoplastic material. The hopper assembly 11 comprises one or more hopper units 12. The top of the hopper assembly 11 is open, allowing solid thermoplastic material to be placed in the hopper assembly. The bottom of the hopper assembly 11 is also open providing an outlet, and a heating grid 13 is mounted within the outlet of the hopper assembly. The heating grid 13 is used to melt the solid thermoplastic material in the hopper. Although the grid 13 is not in the form of a grid in the conventional definition of the term, since it is in the form of a pyramid-shaped cast block, it replaces the heating grids used in prior art systems, so it is called a "grid." The hopper assembly 11 is supported on a reservoir assembly 14 located below the hopper assembly 11, with a ceramic isolator 15 mounted therebetween. The reservoir assembly includes a block 16, the upper surface of which forms a reservoir 17 which receives a supply of melted material from the hopper assembly 11. Inside the reservoir block 16 are a pair of passageways through which the molten thermoplastic flows from the reservoir to a pair of manifold assemblies 18 positioned beneath the reservoir block. (Only one of the manifold assemblies is shown in FIGS. 1 and 2.) Each manifold assembly 18 includes a manifold block 19. The manifold block 19 may include an internal heater or may be heated by means of a separate attached heater plate 20. The reservoir assembly 14 includes a pair of flow shutoff valves 21 mounted in the reservoir block 16 each of which allows the flow of molten material through one of the passageways to one of the manifold assemblies to be shut off. Each of the flow shutoff valves 21 also includes a filter or protection screen to prevent extraneous particulate material from reaching the pump. The manifold assemblies 18 are inserted into a manifold harness or saddle 22 which is suspended from the bottom of the reservoir block 16. The manifold assembly is inserted into the harness and held securely against the reservoir block by means of a screw jack assembly. A pump 23 is adapted to be inserted into each of the manifold assemblies 18. Each of the pumps 23 is connected to a drive assembly 24, and the pump and the drive assembly are mounted on a horizontally moveable carriage 25 which moves on a carriage support 26. Each of the manifold assemblies 18 includes a connection for one or more supply hoses (not shown). The molten thermoplastic material is pumped from the manifold assembly 18 to dispensing heads through the supply hoses.

Figure 3:
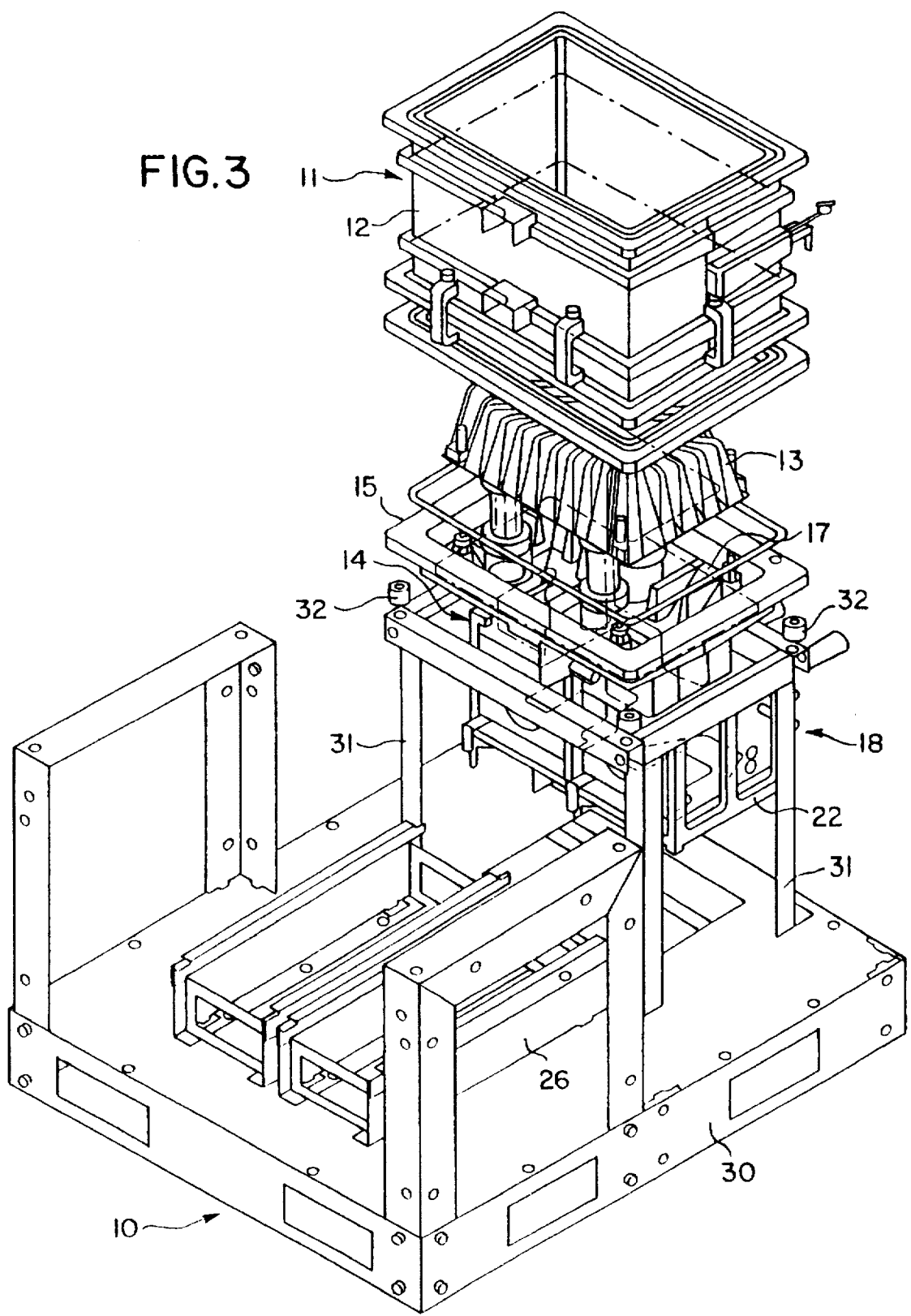
FIG. 3 is another exploded perspective view of the thermoplastic supply system of FIGS. 1 and 2 taken from the rear of the system with the support structure included, but with the drive assembly removed.

The support structure for the supply system 10 is not shown in FIGS. 1 and 2 for the sake of clarity, but it is depicted in FIG. 3. As shown in FIG. 3, the supply system 10 is supported on a base 30 upon which a upstanding frame 31 is mounted. The carriage support 26 is also mounted on the base 30. The reservoir block 16 is supported on the frame 31 with a plurality of isolating spacers 32 mounted therebetween.

While two flow shutoff valves, two manifold assemblies, and two pumps and drive assemblies are shown or described, this is intended to show a typical configuration of the system, and it should be understood that one or more of each of these elements could be used.

As used herein, the "front" of the system 10 and its components is considered to be the side of the system extending forward and to the right in FIGS. 1 and 2, which is also the side from which the shutoff valves 21 are mounted. The "rear" of the system 10 and its components is considered to be the opposite side, that is, the side extending back and to the left in FIG. 1 and 2, which is also the side from which the drive assembly 24 extends.

Figure 4:
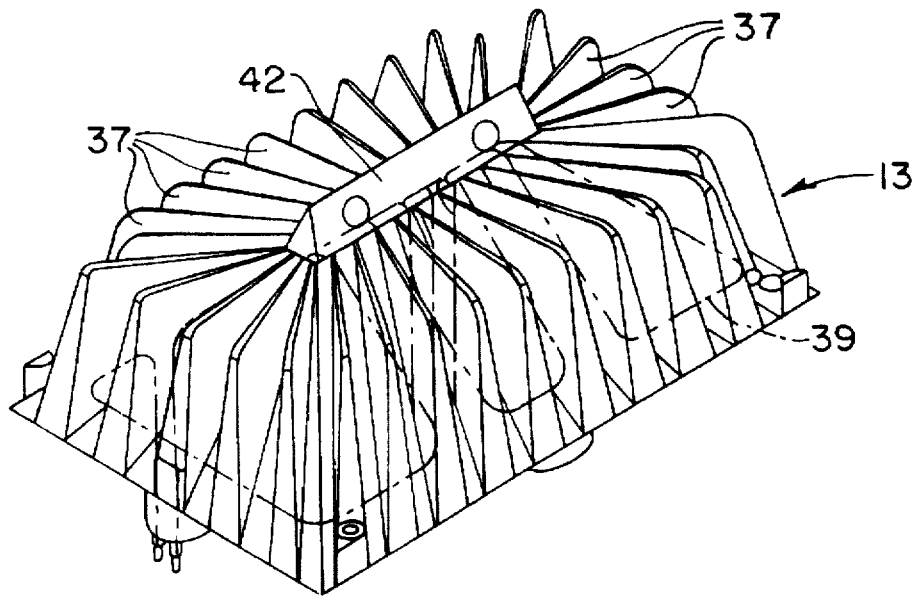
FIG. 4 is a perspective view of the grid used in the system of FIGS. 1–3 when removed from the system.
Figure 5:
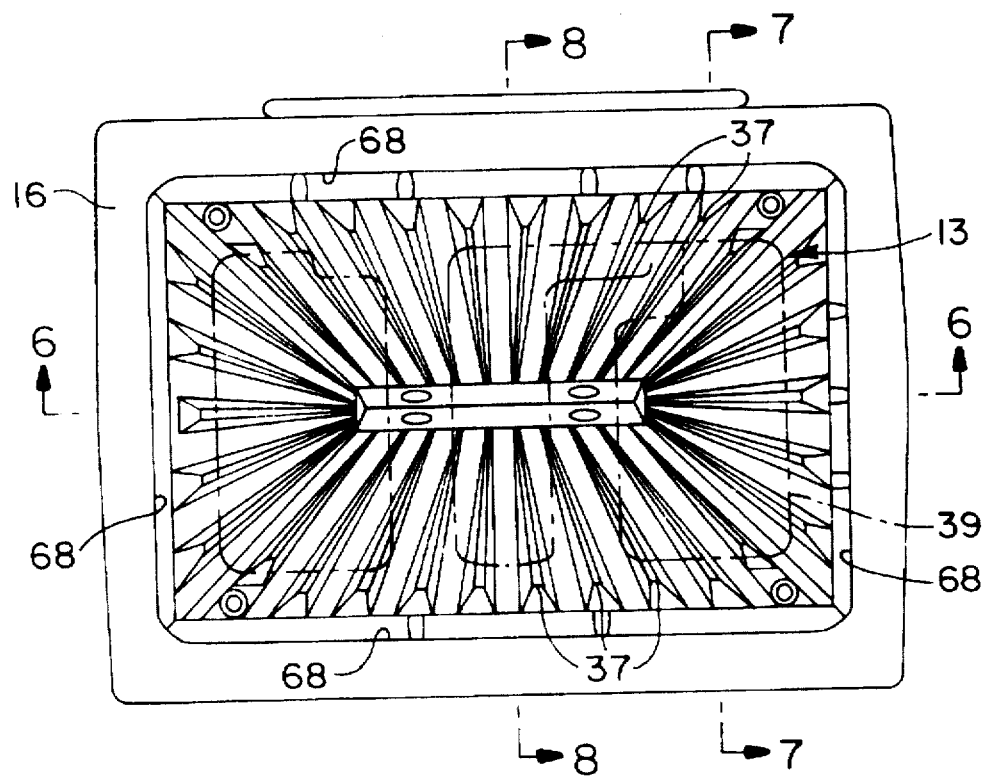
FIG. 5 is a top sectional view of the grid in place at the bottom of the hopper.
Figure 6:
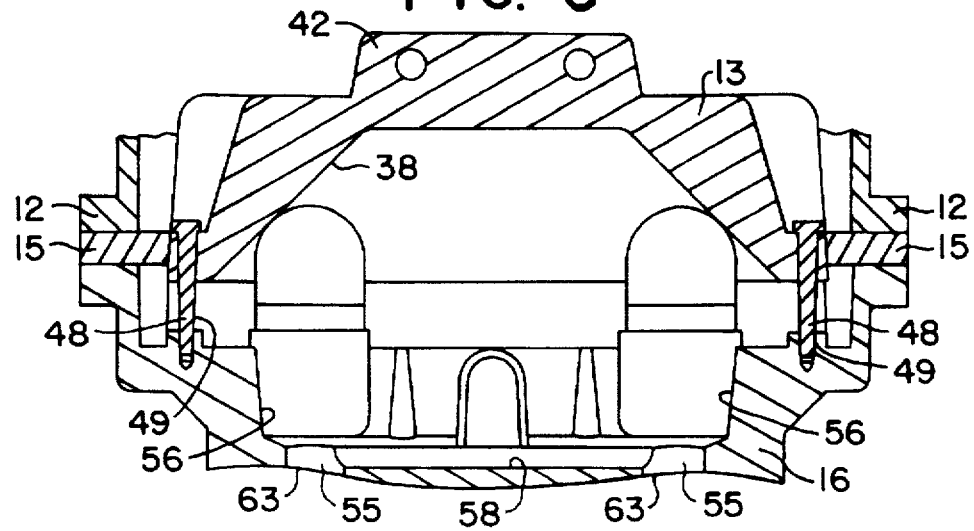
FIG. 6 is a side sectional view of the grid taken along line 6—6 of FIG. 5.
Figure 7:
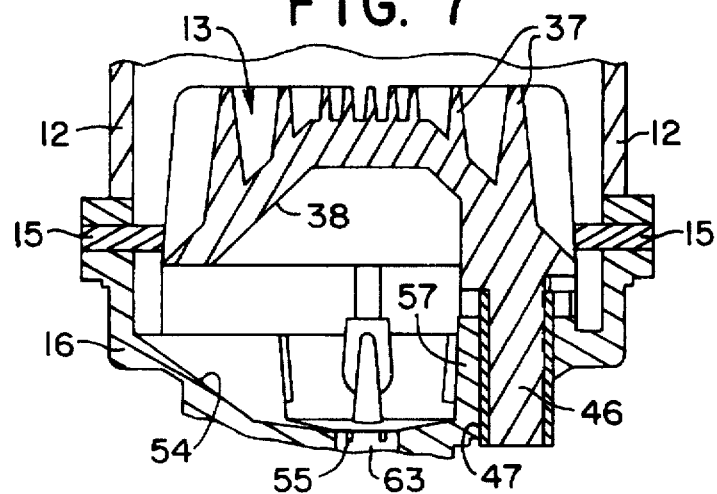
FIG. 7 is a side sectional view of the grid taken along line 7—7 of FIG. 5.
Figure 8:
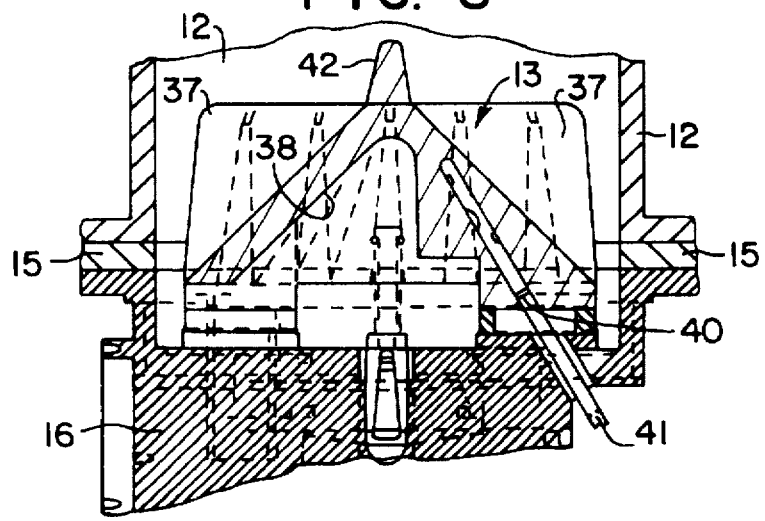
FIG. 8 is another side sectional view of the grid taken along line 8—8 of FIG. 5.

The heating grid 13 is used as the primary means for heating and melting the solid thermoplastic material in the hopper assembly 11. As shown in FIG. 4, the grid 13 is formed of a solid casting having a generally pyramid shape. A plurality of heating fins 37 extend from the upper surface of the grid and increase the surface area of the grid to improve heat transfer. An attachment portion 42 is also provided comprising a flange extending across the top of the grid and having holes to permit the grid to be engaged or hooked by a lifting mechanism, so that it can removed from the system. The grid 13 is preferably cast from a material having good heat transfer properties, such as aluminum. The upper surface of the grid 13 is preferably coated with a conductive material, such as a plasma coating. The upper surface of the grid may also be coated with a material having non-adhesion properties to prevent the material from sticking to the grid. As shown in FIGS. 6–8, the grid 13 has a central hollow cavity 38 extending from the bottom of the grid. The bottom surface of the grid 13 around the cavity 38 is preferably provided with an insulative coating which effectively reflects the heat upwardly and minimizes the amount of heat lost. The air in the cavity 38 also helps to insulate the bottom surface of the grid 13. Three electrical inductive heating elements 39 are cast into the grid 13 when it is formed. The heating elements 39 wind around inside the casting and through the central pyramid shaped portion. The heating elements 39 are depicted as the phantom lines in FIGS. 4 and 5. As shown in FIG. 8, a diagonally extending bore 40 is provided for insertion of an RTD or thermocouple 41 which is used to monitor the temperature of the grid. The position of the bore 40 allows the temperature of the grid 13 to be sensed very near the center of the grid rather than along the sides of the grid, so that the temperature of the grid can be accurately monitored. The RTD 41 can be connected by suitable electrical lines (not shown) to a control system.

The grid 13 is supported primarily on three mounting feet 46 which extend from the bottom of the grid and support the grid from below on the upper surface of the reservoir block 16. Each of the heating elements 39 terminate in the feet 46, so that the heating elements extend into the grid 13 from the bottom of the grid and do not extend to the side of the grid. A ceramic isolator sleeve 47 (FIG. 7) is provided at the lower end of each foot 46 between the foot and the upper surface of the reservoir 17 to thermally isolate the grid from the reservoir and allow the temperature of the heated reservoir to be set independently of that of the grid. The grid 13 is also bolted to the top of the reservoir block using bolts 48 (FIG. 6) to laterally position the grid. An isolator sleeve 49 is also provided around each of the bolts 48 in the reservoir block. The feet 46 and the bolts 48 provide the sole means for supporting the grid 13, so that the grid is supported entirely from below and is not attached to the sides of the hopper assembly 11. The ends of the heating element 39 extend through the feet 46 and are connected to suitable electrical lines (not shown) which supply voltage to the element. The electrical lines can be connected to voltage supply and control system.

The reservoir block 16 is preferably also made from a casting of a material having good heat transfer characteristics, such as aluminum. As shown, the upper surface of the reservoir block 16 forms the reservoir 17 for the material which flows over and around the grid 13. The reservoir 17 is generally in the form of a sink with sloping side walls 54 leading to a pair of outlets 55. The side walls 54 are preferably also coated with a conductive material, such as a plasma coating, and with a material having non-adhesion properties to prevent the material in the reservoir from sticking to the side walls. Electrical inductive heating elements are also cast into the reservoir block 16 to provide for heating of the material in the reservoir 17 to maintain the temperature of the material in the reservoir, and these cast-in heating elements are connected to the control system. Fins are provided extending from the sloped side walls 54 of the reservoir to increase the surface area of the heated reservoir and to assist in heat transfer to the material in the reservoir. Three cylindrical grid support posts 57 extend from the bottom of the reservoir and are used to support the feet 46 of the heating grid. A trough 58 is formed in the bottom of the reservoir between the outlets 55 to permit molten thermoplastic material to easily drain into either of the outlets when the molten material reaches the bottom of the reservoir.

While two outlets 55 are shown, it should be understood that a greater or lesser number of outlets can also be provided depending upon the design needs of the particular system. In the system shown there are two manifold assemblies 18, so that two outlets 55 are needed, one to feed each of the manifold assemblies.

The molten thermoplastic material flowing through each of the reservoir outlets 55 flows through a passageway 63 extending vertically through the reservoir block 16. A separate passageway 63 is provided in the reservoir block 16 for each of the outlets 55, with two passageways shown in the illustrated embodiment. One of the flow shutoff valves 21 is provided for each of the vertically extending passageways 63.

Since the grid is not attached to the sides of the hopper assembly 11, the grid 13 is spaced on all sides from the interior side walls of the hopper assembly, providing a gap 68 between the outer periphery of the grid and the interior side walls of the hopper assembly 11 around all sides of the grid. The solid thermoplastic material in the hopper assembly rests on the grid and, as it is heated by the grid 13, it flows down and around the periphery of the grid through the gap 68 on the sides of the grid and into the reservoir 17. The shape of the grid 13 facilitates the flow of the material down and around the grid and drives the material to the side walls of the reservoir 17. This provides for more uniform heating of the thermoplastic material in the hopper.

The gap 68 between the grid and the interior walls of the hopper assembly permits the grid 13 to be thermally isolated from the exterior of the system. Unlike prior art grids which extended from side to side beneath the hopper and provided the support for the hopper, the grid 13 is located in the middle of the hopper assembly 11 and does not extend to the hopper side walls or to the exterior of the system. The heat generated by the grid 13 is thus retained in the system and is not lost to the outside. The thermoplastic material flows around the sides of the grid 13, and since most thermoplastic materials have good thermal insulating properties, the material helps to insulate thermally the grid from the outside and to retain the heat generated by the grid within the system. The grid 13 thus forms a heating assembly which produces higher temperatures at the interior of the hopper assembly and lower temperatures nearer to the interior side walls of the hopper assembly. Since less heat is lost, more heat is used by the system to heat and melt the thermoplastic material, and the system runs more efficiently.

Preferably the gap 68 is a space of around ½ to ¾ inch between the outer periphery of the grid and the interior side walls of the hopper assembly. The gap 68 should be large enough to provide sufficient flow of the molten material and to avoid clogs. It is preferred to allow larger extraneous particles or foreign objects to pass through the gap rather than be trapped above the gap and create a clog. Any foreign objects which pass through the gap will be caught by the filter in the valve assembly 21 downstream. Since the gap 68 is made large enough to allow small amounts of unmelted thermoplastic material to pass through, and since the material has good insulating properties, the heat produced by the grid 13 may not penetrate to the middle of the gap as the material flows through. Any small amounts of unmelted material, however, will fall upon the sloping side walls of the reservoir 17 and will be melted there.

While the thermally insulative properties of the thermoplastic material assist in insulating the heating grid from the outside and retaining within the system the heat generated by the grid, it also means that some of the material along the interior side walls of the hopper assembly will not be heated by the grid. This material will be melted by the hopper assembly 11 itself, since the hopper side walls are also heated. The hopper assembly 11 and the reservoir block 16, however, are heated to a much lower temperature than the grid. The temperature at which the grid is set to be heated will depend upon the thermoplastic material used and the temperature at which the material softens. For example, if material being used requires that the set point for heating the grid be around 400° F., the hopper might be heated to a lower temperature, so that the grid provides the primary means for heating and melting the thermoplastic material.

Since the grid 13 is supported exclusively from the bottom, the grid can be removed without disassembling the hopper assembly 11. The grid 13 is smaller in dimension than the inner cross section of the hopper assembly, and it is not attached to the sides of the hopper, so the grid may be removed by removing the bolts 48, engaging the attachment portion 42 with a hook or other device, and lifting the grid upwardly through the hopper. As the grid is lifted, the feet 46 will lift from the support posts 57. The capability of removing the grid without disassembling the hopper assembly may be desirable when cleaning the system or to remove an object that may have inadvertently dropped into the hopper and fallen into the reservoir. An object the size of a wrench could, if inadvertently dropped into the hopper, slip through the gap 68 around the outside of the grid. The removability of the grid 13 makes it easier to remove such an object from the reservoir.

The hollow recess or cavity 38 in the interior of the grid 13 allows for expansion of the material in the reservoir beneath the grid when the material cools. The cavity 38 acts as an air or gas pocket within which air or gas is entrapped. When the system is shut down and the molten material solidifies above the level of the heater grid 13 and then re-melted, this air or gas pocket serves as an expansion chamber within which the thermoplastic material may freely expand without creating excessive pressures beneath the solid top of the thermoplastic material in the hopper assembly. The provision of this gas pocket acting as an accumulator or expansion chamber reduces pressure buildup, which in turn results in prevention of the seal leaks between the reservoir and the hopper assembly. Since air also has insulative properties, the air in the cavity 38 also provides an insulating layer which assists the layer of insulative coating provided on the bottom surface of the grid 13 around the cavity 38 in effectively reflecting the heat upwardly and minimizing the amount of heat lost by the grid.

The thermoplastic material flows around the periphery of the grid 13 of the present invention, not through holes provided in the grid. The "grid" of this invention is thus not a "grid" in the classic definitional sense, since it has no holes which extend through it. Prior art grids included holes through which the thermoplastic flowed as it was heated. This design required that a deflector plate be provided in the reservoir beneath the holes, so that the molten thermoplastic material fell on the deflector plate to assure complete melting. By avoiding the presence of these holes, the grid of the present invention avoids the necessity for deflector plates in the reservoir. In addition, by avoiding the presence of holes, the grid of the present invention is less prone to clogging.

While it is preferred that the grid be mounted only from below and that the gap be provided on all sides of the grid without any impedances to the flow of molten material around the grid, it is also possible to utilize many of the advantages of the invention by providing some side stabilizing or mounting means which would extend between the grid and the side walls of the hopper. However, if such means are employed, they should be thermally insulating so that they do not provide a means for conducting heat from the grid to the outside. For example, small ceramic mounts or stabilizers could be provided between the grid and the hopper, and many of the advantages of the present invention would still be enjoyed.

Other variations and modifications of the specific embodiments herein shown and described will be apparent to those skilled in the art, all within the intended spirit and scope of the invention. While the invention has been shown and described with respect to particular embodiments thereof, these are for the purpose of illustration rather than limitation. Accordingly, the patent is not to be limited in scope and effect to the specific embodiments herein shown and described nor in any other way that is inconsistent with the extent to which the progress in the art has been advanced by the invention.

What is claimed is:

1. A system for supplying melted thermoplastic material to a dispenser, which comprises:

a hopper for storing solid thermoplastic material, the hopper having interior side walls and an outlet;

a reservoir block located below the hopper, the reservoir block including a reservoir into which melted material may flow from the hopper;

a manifold and pump assembly connected to the reservoir block for receiving material from the reservoir and pumping the material to a dispenser; and a heating grid at the outlet of the hopper for heating and melting the solid thermoplastic material in the hopper, the grid comprising a block which is separate from the hopper and which is spaced from the interior side walls of the hopper.

2. A system for supplying melted thermoplastic material as defined in claim 1, wherein the heating grid is horizontally spaced on the sides from the interior side walls of the hopper.

3. A system for supplying melted thermoplastic material as defined in claim 1, wherein the heating grid includes a support portion by which the heating grid is vertically supported on the manifold and pump assembly.

4. A system for supplying melted thermoplastic material as defined in claim 3, wherein the support portion supports heating grid on the manifold and pump assembly entirely from below the heating grid.

5. A system for supplying melted thermoplastic material as defined in claim 4, wherein the heating grid includes a heating element which is connected to the grid from the bottom of the grid.

6. A system for supplying melted thermoplastic material as defined in claim 1, wherein the heating grid includes a bore for placement of a temperature sensor, the bore located near the center of the grid.

7. A system for supplying melted thermoplastic material as defined in claim 1, wherein the heating grid has a continuous upper heating surface to direct the flow of the melted thermoplastic material around the grid and between the grid and interior side walls of the hopper.

8. A system for supplying melted thermoplastic material as defined in claim 1, including means for thermally isolating the grid from the hopper to restrict conduction of heat from the grid to the hopper.

9. A system for supplying melted thermoplastic material as defined in claim 1, wherein the grid is removable without disconnecting the hopper assembly from the reservoir block.

10. A system for supplying melted thermoplastic material as defined in claim 1, wherein the grid includes a heating assembly which produces higher temperatures at the interior of the hopper and lower temperatures nearer to the interior side walls of the hopper.

11. A system for supplying melted thermoplastic material as defined in claim 1, wherein the grid comprises a generally pyramid shaped block having protruding heating fins.

12. A system for supplying melted thermoplastic material to a dispenser, which comprises:

a hopper for storing solid thermoplastic material, the hopper having side walls and an outlet, the hopper also having an interior within the side walls;

a reservoir block located below the hopper, the reservoir block including a reservoir into which melted material may flow from the hopper;

a manifold and pump assembly connected to the reservoir block for receiving material from the reservoir and pumping the material to a dispenser; and a heating assembly located at the outlet of the hopper for heating and melting the solid thermoplastic material in the hopper, the heating assembly set to a higher temperature in the interior of the hopper than at the temperature at the side walls of the hopper.

13. A system for supplying melted thermoplastic material as defined in claim 12, wherein the heating assembly comprises a block spaced from the side walls of the hopper.

14. A system for supplying melted thermoplastic material as defined in claim 12, wherein the heating assembly comprises a vertically supported block.

15. A system for supplying melted thermoplastic material as defined in claim 12, wherein the heating assembly comprises a heating grid having a continuous upper heating surface to direct the flow of all of the melted thermoplastic material to flow around the grid and between the grid and interior side walls of the hopper.

16. A heating system for a melted thermoplastic material supply system, which comprises a heating grid for heating and melting solid thermoplastic material, the grid comprising a generally pyramid shaped block having protruding fins, the grid having a continuous upper heating surface devoid of openings through which melted material could flow.

17. A heating system for a melted thermoplastic material supply system as defined in claim 16, wherein the heating grid is entirely vertically supported.

18. A heating system for a melted thermoplastic material supply system as defined in claim 16, wherein the heating grid includes a heating element which is connected to the grid from the bottom of the grid.

19. A heating system for a melted thermoplastic material supply system as defined in claim 16, wherein the heating grid includes a bore for placement of a temperature sensor, the bore located near the center of the grid.

20. A system for supplying melted thermoplastic material to a dispenser, which comprises:

a vertically extending hopper for storing solid thermoplastic material, the hopper having interior side walls and an outlet;

a reservoir block located below the hopper, the reservoir block including a reservoir into which melted material may flow from the hopper;

a manifold and pump assembly connected to the reservoir block for receiving material from the reservoir and pumping the material to a dispenser; and a heating grid below the hopper for heating and melting the solid thermoplastic material in the hopper, the grid capable of being removed vertically without disassembling the hopper.

21. A system for supplying melted thermoplastic material as defined in claim 20, wherein the heating grid includes an attachment portion on the top of the grid for engagement in lifting the grid vertically.

* * * * *

UNITED STATES PATENT AND TRADEMARK OFFICE
CERTIFICATE OF CORRECTION

PATENT NO : 5,715,972
DATED : February 10, 1998
INVENTOR(S) : Shahid A. Siddiqui It is certified that error appears in the above-identified patent and that said Letters Patent is hereby corrected as shown below:

Column 2, line 20, "reincited" should be --remelted--.
Column 3, line 34, "the-reservoir" should be --the reservoir--.

Signed and Sealed this

Twenty-first Day of April, 1998

*Attest:*

BRUCE LEHMAN

*Attesting Officer*            *Commissioner of Patents and Trademarks*